(12) United States Patent
Ash et al.

(10) Patent No.: US 9,542,331 B2
(45) Date of Patent: Jan. 10, 2017

(54) CONCURRENT UPDATE OF DATA IN CACHE WITH DESTAGE TO DISK

(71) Applicant: INTERNATIONAL BUSINESS MACHINES CORPORATION, Armonk, NY (US)

(72) Inventors: Kevin J. Ash, Tucson, AZ (US); Lokesh M. Gupta, Tucson, AZ (US); Kenneth W. Todd, Tuscon, AZ (US); Boyan Zhao, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 180 days.

(21) Appl. No.: 14/493,008

(22) Filed: Sep. 22, 2014

(65) Prior Publication Data

US 2016/0085673 A1    Mar. 24, 2016

(51) Int. Cl.
*G06F 12/08* (2016.01)
(52) U.S. Cl.
CPC ....... *G06F 12/0895* (2013.01); *G06F 12/0868* (2013.01)
(58) Field of Classification Search
CPC .............. G06F 12/0804; G06F 12/0866; G06F 12/0873; G06F 12/124; G06F 3/0689; G06F 11/1008; G06F 2212/224; G06F 2212/102; G06F 11/3442; G06F 12/0897; G06F 2201/885; G06F 2212/281; G06F 3/061; G06F 3/0647; G06F 3/065581; G06F 12/0868; G06F 3/0622; G06F 3/064; Y10S 707/99953; Y10S 707/99954
See application file for complete search history.

(56) References Cited

U.S. PATENT DOCUMENTS

| | | | | |
|---|---|---|---|---|
| 5,581,724 A | * | 12/1996 | Belsan | G06F 11/1076 711/113 |
| 5,774,682 A | * | 6/1998 | Benhase | G06F 12/0866 710/33 |
| 6,192,450 B1 | * | 2/2001 | Bauman | G06F 12/0804 711/133 |
| 7,885,921 B2 | | 2/2011 | Mahar et al. | |
| 8,566,530 B2 | | 10/2013 | Benhase et al. | |
| 2002/0073277 A1 | * | 6/2002 | Butterworth | G06F 12/0873 711/113 |
| 2013/0007372 A1 | | 1/2013 | Beardsley et al. | |

* cited by examiner

*Primary Examiner* — Zhou Li
(74) *Attorney, Agent, or Firm* — Griffiths & Seaton PLLC

(57) ABSTRACT

Mechanisms for concurrent update of data in cache with destage of data from the cache to disk by a processor device. A second copy of the data is established in the cache and on a cache directory. A first copy of the data and the second copy of the data are adjacently ordered in the cache directory. One of the first and second copies is held for an update operation so as to include a latest data modification, while the remaining copy concurrently is used for a destage operation to disk.

12 Claims, 4 Drawing Sheets

CONCURRENT UPDATE OF DATA IN CACHE WITH DESTAGE TO DISK

BACKGROUND OF THE INVENTION

Field of the Invention

The present invention relates in general computing systems, and more particularly to, systems and methods for increased data management efficiency in computing storage environments.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage, and subsequently, demote storage tracks from cache to long-term storage devices so that there is sufficient room in the cache for data to be written.

SUMMARY OF THE INVENTION

When a storage track is being destaged, any updates to the track must wait until the destage operation is complete. This process is required, because, as one may anticipate, if a parallel write operation is allowed while a destage operation is in process, then the destage operation may result in an incomplete write operation to the storage device.

As a result of the foregoing limitation, some input/output (I/O) operations may take some time to complete. For example, a destage operation of a track may take hundreds of microseconds for solid state drive (SSD) storage devices, to tens of milliseconds for hard disk drive (HDD) storage devices. As a result, I/O operations may be held up until destage operations complete. A need exists for a mechanism whereby destage operations do not hold up I/O operations in storage environments as previously described.

Accordingly, and in view of the foregoing, various embodiments for concurrent update of data in cache with destage of data from the cache to disk by a processor device, are provided. A second copy of the data is established in the cache and on a cache directory. A first copy of the data and the second copy are adjacently ordered in the cache directory. One of the first and second copies is held for an update operation so as to include a latest data modification, while the remaining copy concurrently is used for a destage operation to disk.

Other system and computer program product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

As mentioned previously, when a storage track is being destaged, any updates to the track must wait until the destage operation is complete. This process is required, because, as one may anticipate, if a parallel write operation is allowed while a destage operation is in process, then the destage operation may result in an incomplete write operation to the storage device.

As a result of the foregoing limitation, some input/output (I/O) operations may take some time to complete. For example, a destage operation of a track may take hundreds of microseconds for solid state drive (SSD) storage devices, to tens of milliseconds for hard disk drive (HDD) storage devices. As a result, I/O operations may be held up until destage operations complete. A need exists for a mechanism whereby destage operations do not hold up I/O operations in storage environments as previously described.

Again, and as previously described, to address this need, various embodiments for concurrent update of data in cache with destage of data from the cache to disk by a processor device, are provided. A second copy of the data is established in the cache and on a cache directory. A first copy of the data and the second copy are adjacently ordered in the cache directory. One of the first and second copies is held for an update operation so as to include a latest data modification, while the remaining copy concurrently is used for a destage operation to disk.

In one of the mechanisms of the present invention, two copies are maintained in cache and on the cache directory. One copy may be used for/has the latest modifications to the track, and the other copy may be used to conduct destage operations. As will be further described, the two copies may be positioned adjacent to each other on the cache directory, such that the first copy on the cache directory is the copy having the latest data modifications. As such, on a cache directory lookup, the first copy on the cache directory is returned. This first copy may also be the copy that is stored in Non-Volatile Storage (NVS) as will be further described. Finally, the second copy (retained for the destage operation) may be discarded after the destage operation is completed.

By retaining two copies, albeit temporarily, for concurrent data management, the issue of holding up data I/O's while a destage operation completes is alleviated, and throughput in the storage system and efficiencies are thereby enhanced.

Figure 1:
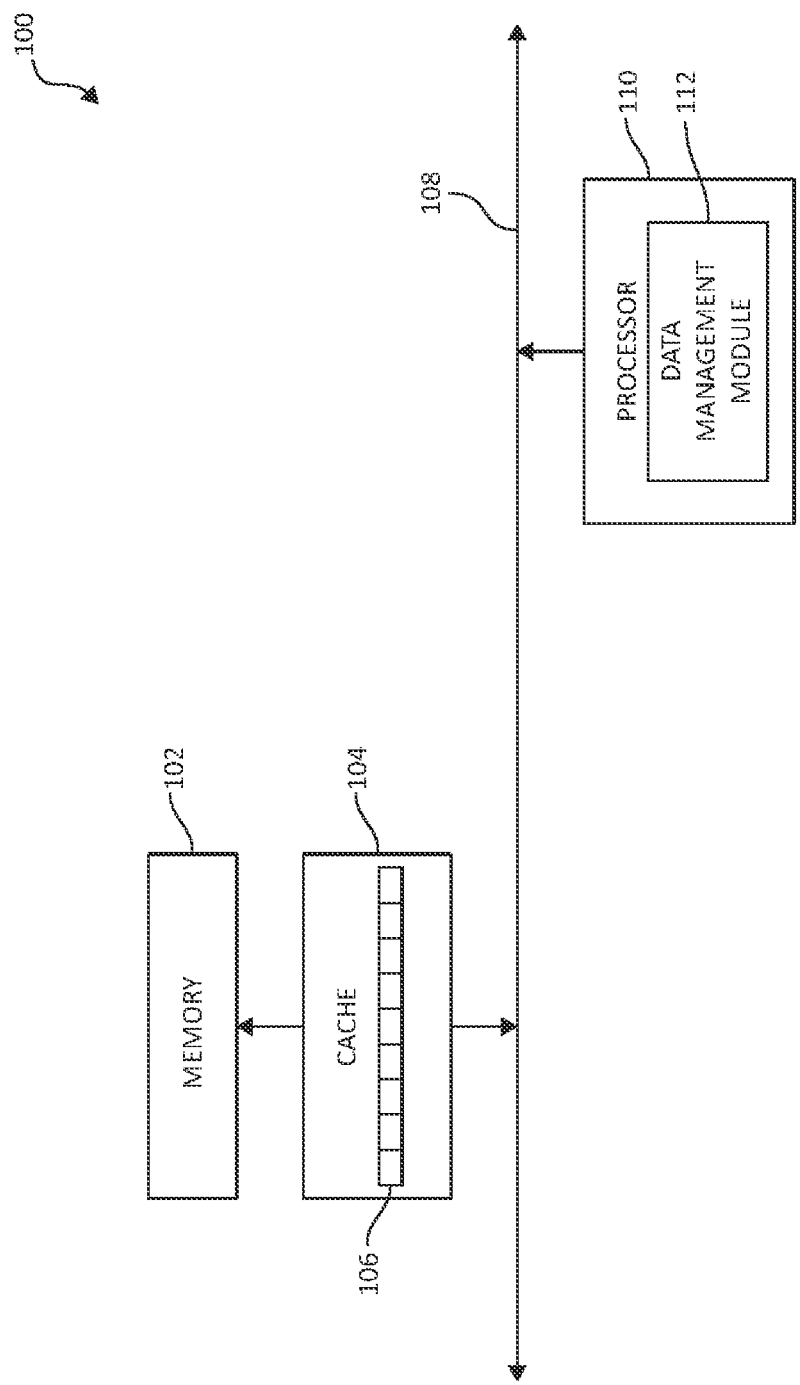
FIG. 1 is an exemplary block diagram showing a hardware structure for cache management in which aspects of the present invention may be realized.

Turning to FIG. 1, a block diagram of one embodiment of a system 100 for data management incorporating various aspects of the present invention is illustrated. At least in the illustrated embodiment, system 100 comprises a memory 102 coupled to a cache 104 and a processor 110 via a bus 108 (e.g., a wired and/or wireless bus).

Memory 102 may be any type of memory device known in the art or developed in the future. Examples of memory 102 include, but are not limited to, an electrical connection having one or more wires, a portable computer diskette, a hard disk, a random access memory (RAM), an erasable programmable read-only memory (EPROM or Flash memory), an optical fiber, a portable compact disc read-only memory (CD-ROM), an optical storage device, a magnetic storage device, or any suitable combination of the foregoing. In the various embodiments of memory 102, storage tracks are capable of being stored in memory 102. Furthermore, each of the storage tracks can be staged or destaged from/to memory 102 from cache 104 when data is written to the storage tracks.

Cache 104, in one embodiment, comprises a write cache partitioned into one or more ranks 106, where each rank 106 includes one or more storage tracks. Cache 104 may be any cache known in the art or developed in the future.

During operation, the storage tracks in each rank 106 are destaged to memory 102 in a foreground destaging process after the storage tracks have been written to. That is, the foreground destage process destages storage tracks from the rank(s) 106 to memory 102 while a host (not shown) is actively writing to various storage tracks in the ranks 106 of cache 104. Ideally, a particular storage track is not being destaged when one or more hosts desire to write to the particular storage track, which is known as a destage conflict.

In various embodiments, processor 110 comprises or has access to a cache management module 112, which comprises computer-readable code that, when executed by processor 110, causes processor 110 to perform data management operations in accordance with aspects of the illustrated embodiments. In the various embodiments, processor 110, for example, may establish a second copy of tracks of data in cache and on the cache directory, adjacently ordered, where one copy is held for an update operation while the remainder is concurrently used for a destage operation.

In various other embodiments, processor 110 may determine if a new copy of a data track needs to be created.

In various other embodiments, processor 110 may determine whether a destage operation of a track is needed while the track's access is being held for update by another task.

In various other embodiments, processor 110, pursuant to determining previously that a destage operation of the track is needed while the track is being held for update, may create a new copy of the track following the original track in the cache directory chain, and use the new copy of the track for the destage operation.

In various other embodiments, processor 110 may determine whether a track access for an update is needed while a track is currently being destaged.

In various other embodiments, processor 110, pursuant to determining previously that the track access for the update is needed while the track is currently being destaged, may create a new copy of the track ahead of the original track in the cache directory chain. The processor 110 may then use the new track for the update operation as the original track is concurrently being used for the destage operation previously described.

In various other embodiments, processor 110 may determine whether the destage operation(s) described previously have completed.

In various other embodiments, processor 110, following a determination that the destage operation(s) have completed for a particular track, may remove the data track from the cache directory chain and de-allocate the data track.

Figure 2:
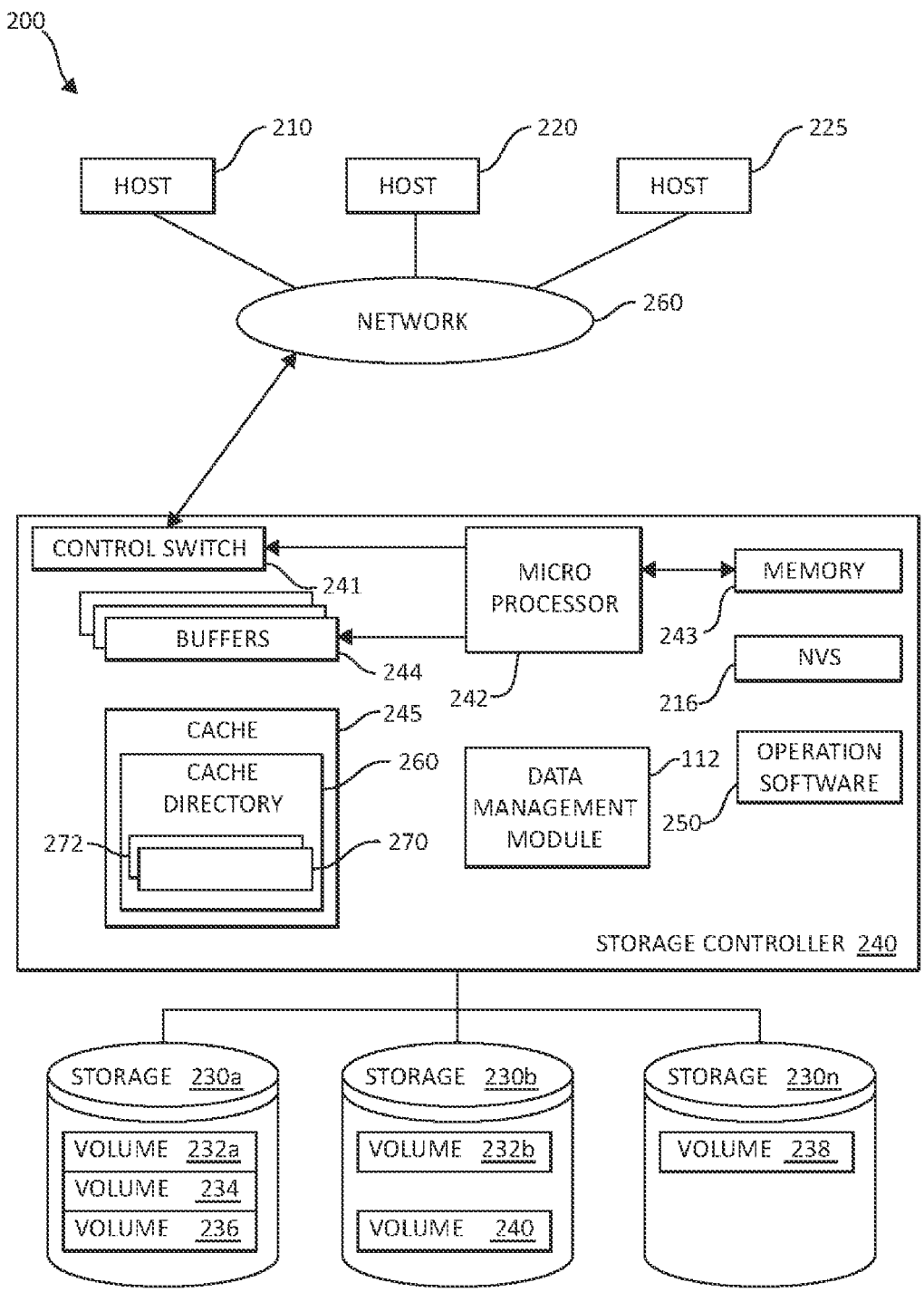
FIG. 2 is an exemplary block diagram showing a hardware structure of a data storage system in a computer system according to the present invention in which aspects of the present invention may be realized.

FIG. 2 is a block diagram 200 illustrating an exemplary hardware structure of a data storage system in which aspects of the present invention may be implemented. Host computers 210, 220, 225, are shown, each acting as a central processing unit for performing data processing as part of a data storage system 200. The cluster hosts/nodes (physical or virtual devices), 210, 220, and 225 may be one or more new physical devices or logical devices to accomplish the purposes of the present invention in the data storage system 200. A Network (e.g., storage fabric) connection 260 may be a fibre channel fabric, a fibre channel point-to-point link, a fibre channel over ethernet fabric or point to point link, a FICON or ESCON I/O interface. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controllers 240 and cluster hosts 210, 220, and 225. The cluster hosts 210, 220, and 225 may include cluster nodes.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Moreover, given the use of the storage fabric network connection 260, additional architectural configurations may be employed by using the storage fabric 260 to connect multiple storage controllers 240 together with one or more cluster hosts 210, 220, and 225 connected to each storage controller 240.

In some embodiments, the system memory 243 of storage controller 240 includes operation software 250 and stores program instructions and data which the processor 242 may access for executing functions and method steps associated with executing the steps and methods of the present invention. As shown in FIG. 2, system memory 243 may also include or be in communication with a cache 245, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 may be implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245. In one embodiment, NVS 216 may be used to store the "first" copy of the data that is used for data update operations as previously described.

The storage controller 240 may include a data management module 112. The data management module 112 may incorporate internal memory (not shown) in which the destaging algorithm may store unprocessed, processed, or "semi-processed" data. The data management module 112 may work in conjunction with each and every component of the storage controller 240, the hosts 210, 220, 225, and other storage controllers 240 and hosts 210, 220, and 225 that may be remotely connected via the storage fabric 260. Data management module 112 may be structurally one complete module or may be associated and/or included with other individual modules. Data management module 112 may also be located in the cache 245 or other components of the storage controller 240.

The storage controller 240 includes a control switch 241 for controlling a protocol to control data transfer to or from the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, and the data management module 112, in which information may be set. The multiple buffers 244 may be implemented to assist with the methods and steps as described herein.

Cache 245, in combination with data management module 112, may perform various aspects of the present invention as will be further described, such as establishing and maintaining two copies of data tracks as will be further described. Cache 245 is shown inclusive of cache directory 260, where adjacent data tracks 270 and 272 are shown as entries in a portion of a cache directory chain. According to various mechanisms of the illustrated embodiments, the track 270 may be maintained for latest data update operations, while a subsequent track 272 may be maintained for concurrent destage operations.

Figure 3:
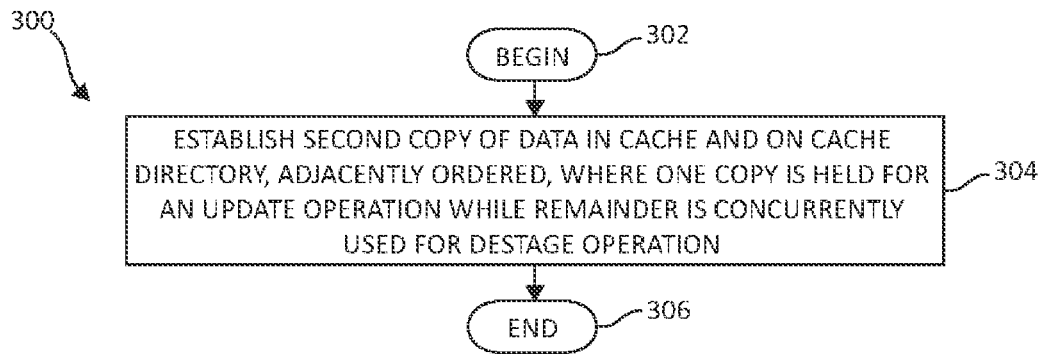
FIG. 3 is a flow chart diagram illustrating an exemplary method for allowing data updates in cache current with destages of data from cache to disk, in which aspects of the present invention may be realized.

Turning now to FIG. 3, a flow chart diagram, illustrating a generalized method method 300 for cache/data management in accordance with the present invention, is depicted. Method 300 begins (step 302). A second copy of data is established in cache and on the cache directory, adjacently ordered, where one copy is held for an update operation, while the remainder is concurrently used for a destage operation (step 304). The method 300 then ends (step 306).

Figure 4:
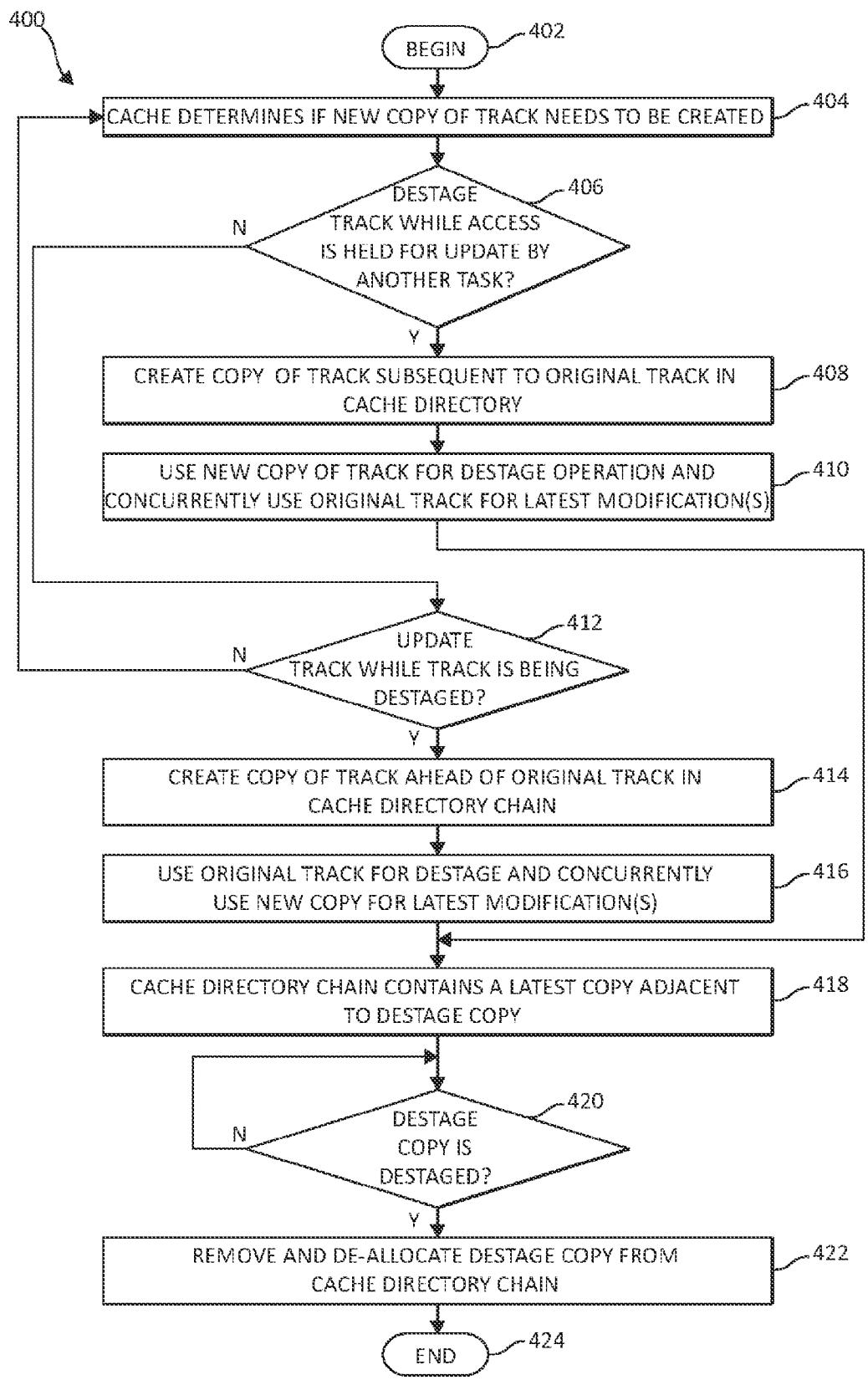
FIG. 4 is an additional flow chart diagram illustrating an additional exemplary method for following data updates in cache current with destages of data from cache to disk, again in which aspects of the present invention may be realized

Turning now to FIG. 4, an additional flow chart diagram of exemplary data management operations, in which aspects of the illustrated embodiments are incorporated, is depicted. Method 400 begins (step 402) with the cache determining if a new copy of a particular track needs to be created (step 404).

In a following decision step, method 400 queries whether a destage operation is needed while access to a particular track is currently being held for update by another task (step 406). If so, a copy of the data track is created and positioned subsequent to the original track in the cache directory chain (step 408). This new copy of the track is then used for the destage operation that was determined earlier to be needed, while (and concurrently therewith) the existing, original track is used for the data update operation(s) to maintain the latest data updates.

Returning to step 406, if no, the method 400 queries whether an update operation need be performed while a particular data track is being destaged (step 412). If so, a new copy of the data track is created and positioned adjacently ahead of the original track in the cache directory chain (step 414). In this scenario, the new track is used for the data update operation(s) while the existing track is used/continues to be used concurrently with the data update operation(s) for the currently executing destage operation(s) (step 416).

In either the case of steps 408-410, or steps 414-416, the cache directory chain then contains a latest copy of data update(s), which is adjacent to a destage copy of the data (step 418).

Turning to decision step 420, method 400 then queries if the destage copy has been destaged (e.g., the destage operation(s) have completed fully). If so, the destage copy is removed and de-allocated from the cache directory chain (step 422). The method 400 then ends (step 424).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for concurrent update of data in cache with destage of data from the cache to disk by a processor device, comprising:
    establishing a second copy of the data in the cache and on a cache directory, a first copy of the data and the second copy adjacently ordered in the cache directory, wherein one of the first and second copies is held for an update operation so as to include a latest data modification, while the remaining copy concurrently is used for a destage operation to disk;
    determining, at a track access event, by the cache, if the second copy of the data need be created;
    if the destage operation is to be performed while a track of the data is held for update by an additional operation, performing at least one of:
        creating the second copy of the data,
        positioning the second copy of the data adjacently following the first copy of the data in a chain of the cache directory, and
        using the second copy of the data for the destage operation; and
    if the update operation is to be performed while a track of the data is being destaged to the disk, performing at least one of:
        creating the second copy of the data,
        positioning the second copy of the data adjacently previous to the first copy of the data in the cache directory chain, and
        using the second copy of the data for the update operation.

2. The method of claim 1, further including using the first copy to return on a cache directory lookup operation.

3. The method of claim 1, further including storing the first copy in Non-Volatile Storage (NVS).

4. The method of claim 1, further including discarding the second copy following the destage operation.

5. A system for concurrent update of data in cache with destage of data from the cache to disk, comprising:
    a processor device, wherein the processor device establishes a second copy of the data in the cache and on a cache directory, a first copy of the data and the second copy adjacently ordered in the cache directory, wherein one of the first and second copies is held for an update operation so as to include a latest data modification, while the remaining copy concurrently is used for a destage operation to disk;
    determines, at a track access event, by the cache, if the second copy of the data need be created;
    if the destage operation is to be performed while a track of the data is held for update by an additional operation, performs at least one of:
        creating the second copy of the data,
        positioning the second copy of the data adjacently following the first copy of the data in a chain of the cache directory, and
        using the second copy of the data for the destage operation; and if the update operation is to be performed while a track of the data is being destaged to the disk, performs at least one of:
   creating the second copy of the data,
   positioning the second copy of the data adjacently previous to the first copy of the data in the cache directory chain, and
   using the second copy of the data for the update operation.

6. The system of claim 5, wherein the processor device uses the first copy to return on a cache directory lookup operation.

7. The system of claim 5, wherein the processor device stores the first copy in Non-Volatile Storage (NVS).

8. The system of claim 5, wherein the processor device discards the second copy following the destage operation.

9. A computer program product for concurrent update of data in cache with destage of data from the cache to disk by a processor device, the computer program product comprising a non-transitory computer-readable storage medium having computer-readable program code portions stored therein, the computer-readable program code portions comprising:
   a first executable portion that establishes a second copy of the data in the cache and on a cache directory, a first copy of the data and the second copy adjacently ordered in the cache directory, wherein one of the first and second copies is held for an update operation so as to include a latest data modification, while the remaining copy concurrently is used for a destage operation to disk;
   a second executable portion that determines, at a track access event, by the cache, if the second copy of the data need be created; and
   a third executable portion that, if the destage operation is to be performed while a track of the data is held for update by an additional operation, performs at least one of:
      creating the second copy of the data,
      positioning the second copy of the data adjacently following the first copy of the data in a chain of the cache directory, and
      using the second copy of the data for the destage operation; and
   if the update operation is to be performed while a track of the data is being destaged to the disk, performs at least one of:
      creating the second copy of the data,
      positioning the second copy of the data adjacently previous to the first copy of the data in the cache directory chain, and
      using the second copy of the data for the update operation.

10. The computer program product of claim 9, further including a fourth executable portion that uses the first copy to return on a cache directory lookup operation.

11. The computer program product of claim 9, further including a fourth executable portion that stores the first copy in Non-Volatile Storage (NVS).

12. The computer program product of claim 9, further including a fourth executable portion that discards the second copy following the destage operation.

* * * * *